(No Model.)

C. R. TURNER.
MEAT SHAVER.

No. 586,403. Patented July 13, 1897.

WITNESSES:

INVENTOR
C. R. Turner.
BY
ATTORNEYS.

UNITED STATES PATENT OFFICE.

CALEB R. TURNER, OF BROOKLYN, NEW YORK, ASSIGNOR TO KATE E. TURNER, OF SAME PLACE.

MEAT-SHAVER.

SPECIFICATION forming part of Letters Patent No. 586,403, dated July 13, 1897.

Application filed December 14, 1896. Serial No. 615,550. (No model.)

*To all whom it may concern:*

Be it known that I, CALEB R. TURNER, of Brooklyn, in the county of Kings and State of New York, have invented a new and Improved Meat-Shaver, of which the following is a full, clear, and exact description.

The object of the invention is to provide a new and improved meat-shaver which is simple and durable in construction and arranged to properly feed the meat to the slicing or shaving knife and to permit the operator to regulate the feed for thicker or thinner slices.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1:
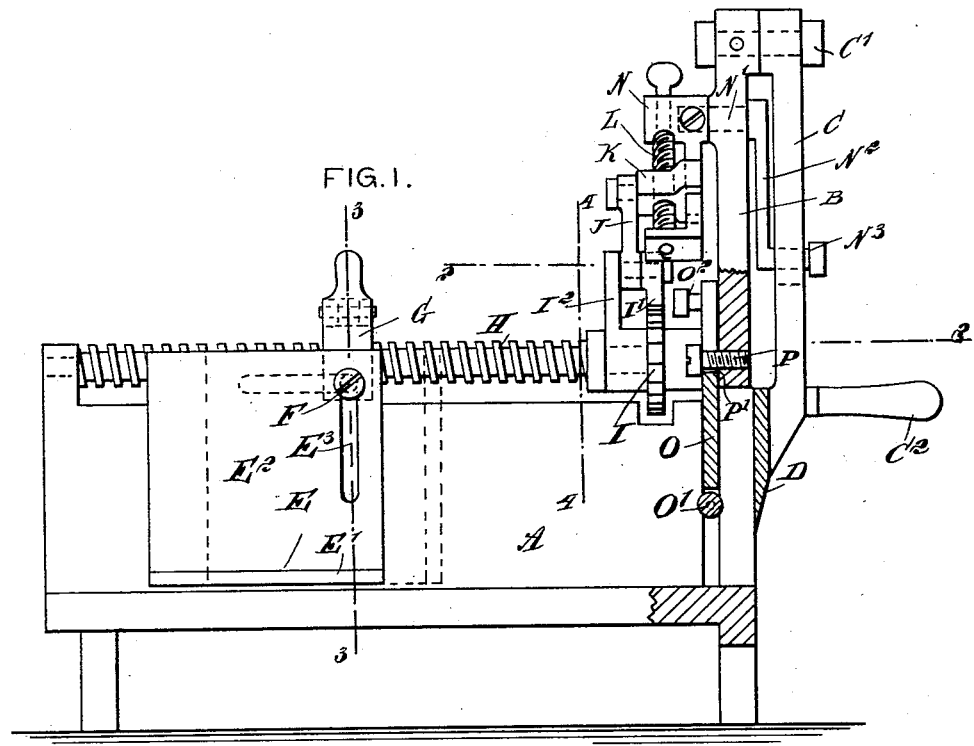
Figure 4:
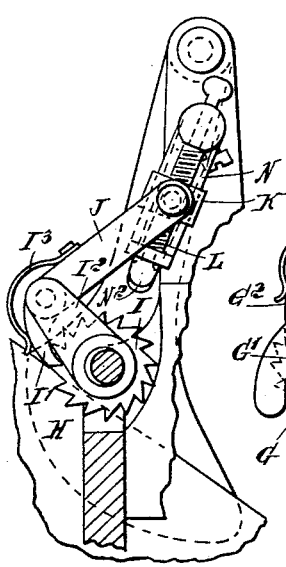
Figure 3:
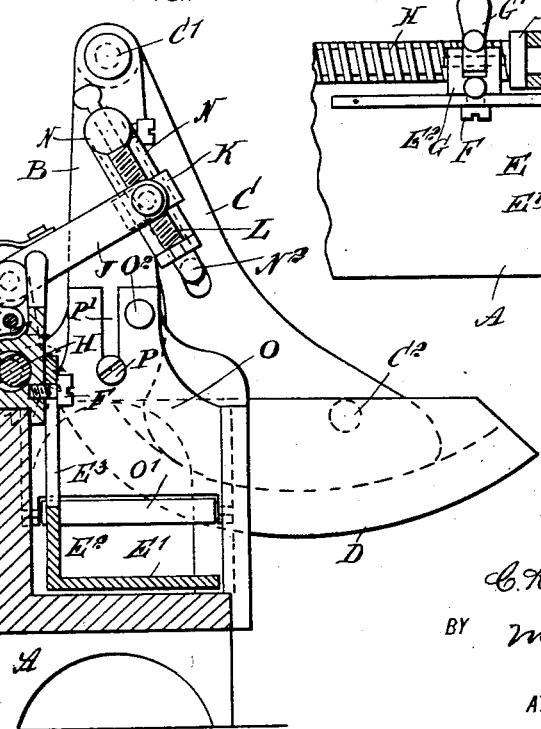
Figure 2:
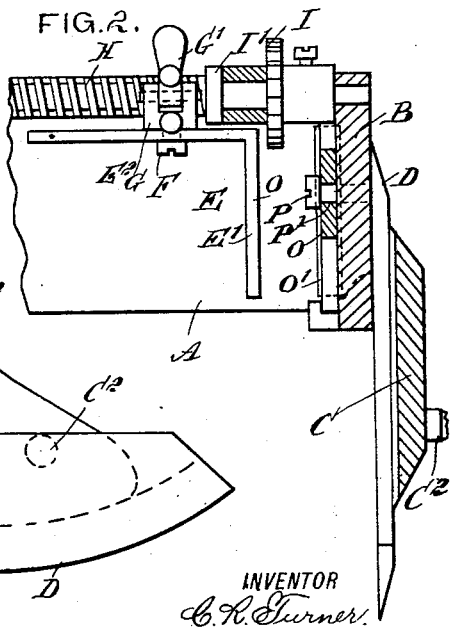

Figure 1 is a side elevation of the improvement with parts in section. Fig. 2 is a sectional plan view of the same on the line 2 2 of Fig. 1. Fig. 3 is a transverse section of the improvement on the line 3 3 of Fig. 1. Fig. 4 is a sectional view of part of the improvement on the line 4 4 of Fig. 1.

The improved meat-shaver is provided with an L-shaped trough A, adapted to receive the meat, and on the front end of said trough is held a standard B, carrying at its upper end a pivot $C'$ for the knife-frame C, carrying a segmental knife D, adapted to cut slices from the meat at the front end of the trough A. The frame C is provided with a suitable handle $C^2$ for imparting a swinging motion to the knife D, so as to draw the cutting edge thereof across the meat and cut slices therefrom.

The meat is fed in the trough A by means of a longitudinally-moving carrier or pusher E, made L-shaped and having an arm $E'$ and a back $E^2$ hung near the back of the trough A, while the horizontal arm $E'$ is adapted to carry the meat near the bottom of the trough or is adapted to push the meat in the trough when the position of the carrier is changed to that indicated in dotted lines in Fig. 1, the carrier-back $E^2$ being for this purpose provided with a slot $E^3$, through which extends a screw F, forming a pivot for swinging the carrier into either of two positions, so that the carrier acts for moving the meat forward bodily or for pushing the same in the trough toward the knife.

The screw F is held in a block G, through which passes loosely a feed-screw H, journaled in suitable bearings in the ends of the trough A, the said screw being adapted to be engaged by a sectional nut $G'$, held on a gravity-pawl $G^2$, fulcrumed on the block G, so as to lock the block to the feed-screw to move forward and backward on the top edge of the trough when the screw H is turned.

When it is desired to shift the carrier or pusher E rapidly forward or backward independent of the feed-screw H, the operator swings the gravity-pawl $G^2$ outward to disengage the segmental nut $G'$ from the feed-screw to permit of sliding the block G forward or backward on its guideways on the trough A to bring the carrier to the desired position.

On the forward end of the feed-screw H is secured a ratchet-wheel I, engaged by a pawl $I'$, held on an arm $I^2$, mounted to swing loosely on the forward end of the feed-screw H, the said pawl $I'$ being held in contact with the ratchet-wheel by a suitable spring $I^3$. The arm $I^2$ is pivotally connected by a link J with a nut K, engaged by a feed-screw L, mounted to turn in an arm N, forming a guideway for the nut K, so that when the screw L is turned by the operator the nut K is moved up or down on the arm N, so as to increase or diminish the throw of the nut, and consequently the feed of the screw H.

The arm N receives a swinging motion from the knife-frame C, and for this purpose the upper end of the arm N is provided with a shaft $N'$, mounted to turn in bearings in the standard B and carrying at its front end an arm $N^2$, engaging by a pin $N^3$ an elongated opening in the knife-frame C. Now when the knife-frame C is rocked forward and backward for causing the knife to cut, then the arm $N^2$ receives a swinging motion and a like swinging motion is given to the arm N, whereby the link J imparts a swinging motion to the arm $I^2$, so that the pawl $I'$ turns the ratchet-wheel I during the return swinging motion of the knife-frame C. The turning of the ratchet-wheel I causes a like movement of the feed-screw H and a forward movement of the carrier E to move the meat beyond the front end of the trough for the knife D to cut on on the next downward stroke of the knife-frame C. Now by shifting the nut K up or down on the screw L less or more feed can be given to the carrier E, and consequently thinner or thicker slices are cut by the knife.

In order to prevent the operator from getting his fingers under the knife, I provide the front end of the trough with a gate O, fitted to slide vertically in suitable bearings on the standard B, the said gate being provided at its lower end with a friction-roller O', resting loosely on the top of the meat as the latter passes to the knife. A handle $O^2$ is held on the upper end of the gate O, so as to permit of lifting the gate when putting the meat under the front end of the trough. A screw P, engaging a slot P', prevents the gate O from being accidentally lifted out of its guideways.

It is understood that the gate does not interfere with the forward feed of the meat, as the friction-roller O' will rotate when the meat is carried or pushed forward.

Having thus fully described my invention, I claim as new and desire to secure by Letters Patent—

1. A meat-shaver, provided with a knife-frame carrying a knife and mounted to swing, a rocking arm adapted to be actuated from the said knife-frame, a screw-rod mounted to turn on the said rocking arm and carrying a nut fitted to slide on the said arm, a link connected with the nut, a feed-screw, and a pawl-and-ratchet mechanism on the said feed-screw and connected with the said link, substantially as shown and described.

2. In a meat-shaving apparatus, the combination with a frame, of a swinging knife-frame having a slot, a rock-shaft mounted in the frame, an arm fixed to the rock-shaft and having a portion working in the slot of the knife-frame, a second arm fixed to the rock-shaft, a screw revoluble on the arm and running longitudinally therewith, a nut sliding on the arm and actuated by the screw, a link pivoted to the nut, a meat-carriage, a feed-screw for the meat-carriage, and a pawl-and-ratchet device for turning the feed-screw from the movement of the link, substantially as described.

3. In a meat-shaving apparatus, the combination with a frame, of a knife-frame mounted to swing thereon, a rock-shaft journaled in the frame, an arm fixed to the rock-shaft and having at one end a sliding connection with the knife-frame, a second arm fixed to the rock-shaft, a screw running longitudinally with and turning on the second arm, a nut sliding on the second arm and actuated by the screw, a link connected to the nut, a screw-shaft, an arm swinging on the screw-shaft and connected to the link, a pawl carried by the arm, a ratchet-disk fixed to the screw-shaft and engaged by the pawl, and a carriage sliding on the frame and moved by the screw-shaft, substantially as described.

4. In a meat-shaving apparatus, the combination with a frame, of a knife-frame mounted to swing thereon, a rock-shaft mounted in the frame and oscillated by the knife-frame, an arm carried by the rock-shaft, a nut sliding on the arm, a screw actuating the nut, a link connected to the nut, a screw-shaft, an arm swinging on the screw-shaft and connected to the link, a pawl carried by the arm and the link, a ratchet-disk fixed to the screw-shaft and engaged by the pawl, and a meat-carriage carried on the frame and actuated by the screw-shaft, substantially as described.

5. In a meat-shaving apparatus, the combination with a frame, of a knife-frame mounted to swing thereon, an arm rockably mounted on the frame and actuated by the knife-frame, a nut adjustable on the arm, a link pivotally connected to the nut, a screw-shaft, an arm swinging on the screw-shaft and connected to the link, a pawl carried by the arm and link, a ratchet-wheel fixed to the shaft and engaged by the pawl, and a meat-carriage sliding on the frame and moved by the screw-shaft, substantially as described.

6. The combination of a main or body portion, cutting mechanism mounted on the main or body portion, a member sliding on the said main or body portion toward and from the cutting mechanism, the member having an angular form, one portion of which is provided with a slot, and means for advancing said member, such means comprising a part capable of fitting in the slot so that the member may be swung on said part to change the position of the said member and thus adapt the member both for carrying and pushing material on the main or body portion.

CALEB R. TURNER.

Witnesses:
 THEO. G. HOSTER,
 JAMES M. HENLEY.